United States Patent [19]

Flitton

[11] Patent Number: 4,678,305
[45] Date of Patent: Jul. 7, 1987

[54] PHOTOGRAPHIC CAMERA

[75] Inventor: James F. Flitton, Lightwater, England

[73] Assignee: Photo-Me International PCL, Surrey, England

[21] Appl. No.: 843,319

[22] Filed: Mar. 24, 1986

[30] Foreign Application Priority Data

Sep. 27, 1985 [GB] United Kingdom ............... 8523912

[51] Int. Cl.[4] ............... G03B 17/00; G03B 29/00
[52] U.S. Cl. ............................. 354/203; 355/28
[58] Field of Search ............ 355/18, 19, 27–29, 355/40, 41, 64; 354/202, 203, 212, 83, 159

[56] References Cited

U.S. PATENT DOCUMENTS 1,870,091  8/1932  Briechle ........................ 354/203
2,751,814  6/1956  Limberger ..................... 355/28
2,891,443  6/1959  Pollock ......................... 355/19
3,557,675  1/1971  Koll et al. ..................... 355/27
4,035,074  7/1977  Flor ........................... 355/64 X

FOREIGN PATENT DOCUMENTS 612277  7/1979  Switzerland ..................... 355/29

Primary Examiner—Donald A. Griffin
Attorney, Agent, or Firm—Pennie & Edmonds

[57] ABSTRACT

A photographic camera has two guides for engaging mutually opposite edge portions of photographic film at an exposure plane where the film is exposed to take a photograph. The guides are movably mounted so that they can be temporarily retracted for the exposure, so that the edge portions of the film are also exposed to take the photograph, which is thus 'borderless'.

10 Claims, 16 Drawing Figures

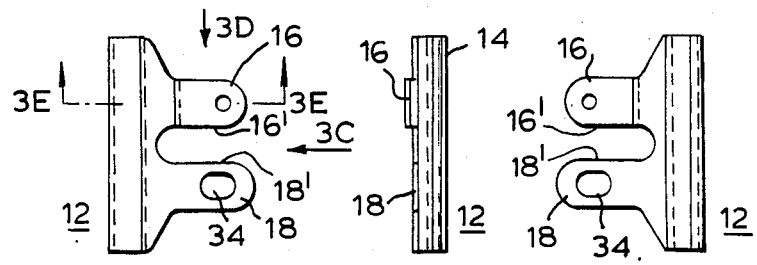
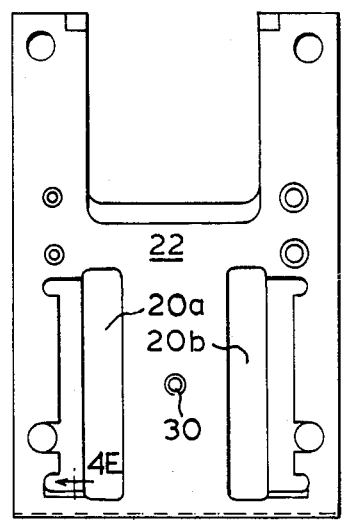

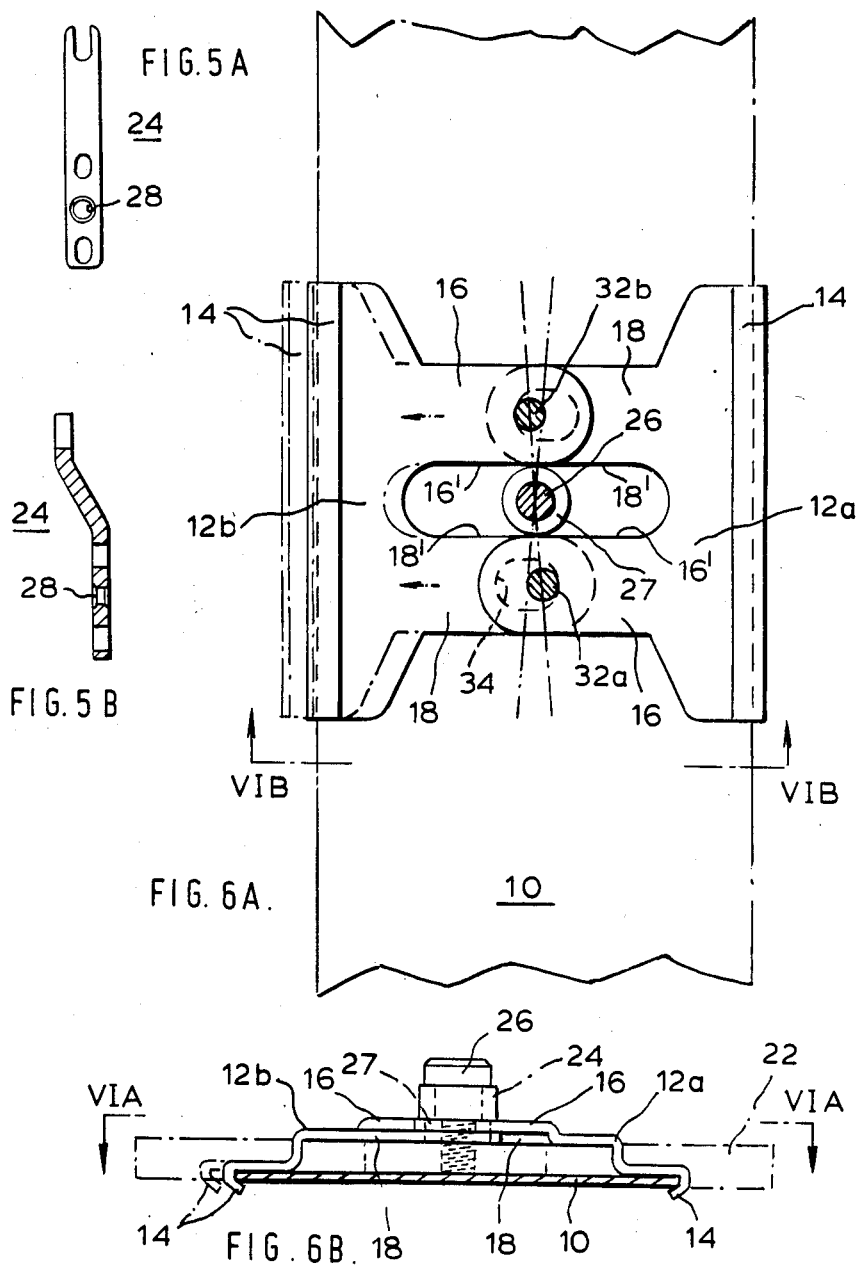

PHOTOGRAPHIC CAMERA

BACKGROUND OF THE INVENTION

1. Field of the Invention

This invention relates to a photographic camera of a type comprising two guides for engaging mutually opposite edge portions of photographic film at an exposure plane where the film is exposed to take a photograph.

The invention is particularly applicable to such a photographic camera having means provided for automatically in sequence feeding the film to the exposure plane, stopping the film feed for the photograph to be taken and then feeding the film to automatic treatment apparatus, as commonly used in self-portrait photographic booths.

2. Description of the Prior Art

British patent specification No. 1 493 374 discloses such a photographic camera, although the terminology employed therein may not be identical with terminology employed in the present specification.

In the known photographic camera referred to above, the two guides prevent the edge portions of the film from being exposed to take the photograph. Accordingly, the known photographic camera incorporates means for exposing borders of the film to white light so as to produce a white border around the photograph.

SUMMARY OF THE INVENTION

According to the present invention there is provided a photographic camera comprising two guides for engaging mutually opposite edge portions of photographic film at an exposure plane where the film is exposed to take a photograph, characterised by means for temporarily retracting the two guides, which are retractable, so that the edge portions are also exposed to take the photograph.

BRIEF DESCRIPTION OF THE DRAWINGS

FIGS. 3A-3E illustrate one of two identical guides of the photographic camera, FIGS. 3A and 3B being opposite elevations, FIG. 3C being a view in the direction of arrow 3C in FIG. 3A, FIG. 3D being a view in the direction of 3D of FIG. 3A and FIG. 3E being a section on line 3E—3E of FIG. 3A;

FIGS. 4A-4E illustrate a mounting plate in the camera for the guides, FIGS. 4A and 4B respectively being a rear elevation and side elevation of the mounting plate and FIGS. 4C, 4D and 4E respectively being sections on lines 4C—4C, 4D—4D and 4E—4E in FIG. 4A;

FIGS. 5A and 5B are an elevation and longitudinal section respectively of a pivoted lever for operating the two guides; and FIGS. 6A and 6B are partly diagrammatic illustrations of the film, the two guides and parts of the pivoted lever, FIG. 6A being a view on line VIA—VIA of FIG. 6B with plate 22 omitted for purposes of illustration and FIG. 6B being a view on line VIB—VIB of FIG. 6A.

DESCRIPTION OF THE PREFERRED EMBODIMENT

Figure 1:
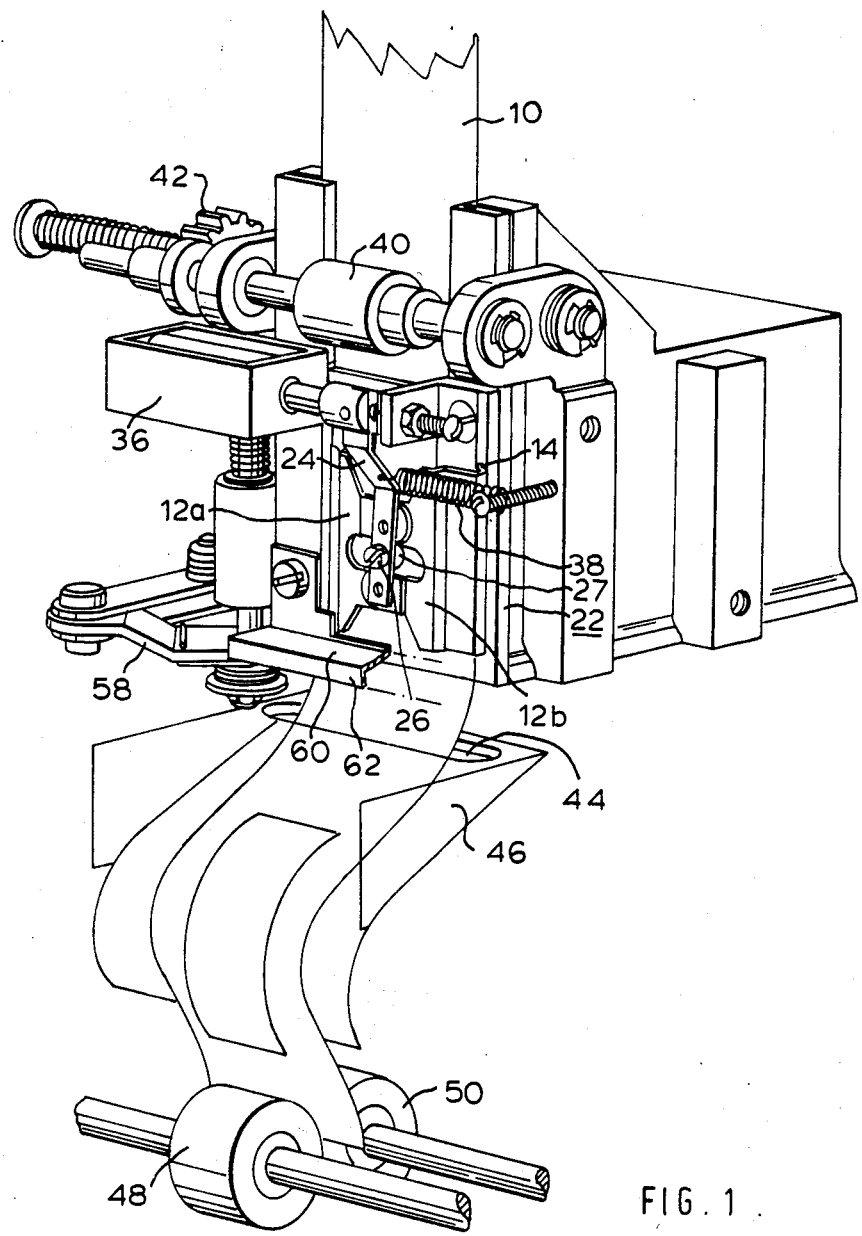
FIG. 1 is a perspective view of parts of a photographic camera embodying the invention, from behind and one side of the exposure plane.

Referring to the drawings, the photographic camera illustrated therein is adapted for feeding a reversal-type photographic film 10 automatically to an exposure plane where the film is exposed to take a photograph. The camera comprises a conventional shutter (not shown) for exposing the film at the exposure plane to take a photograph.

Figure 2:
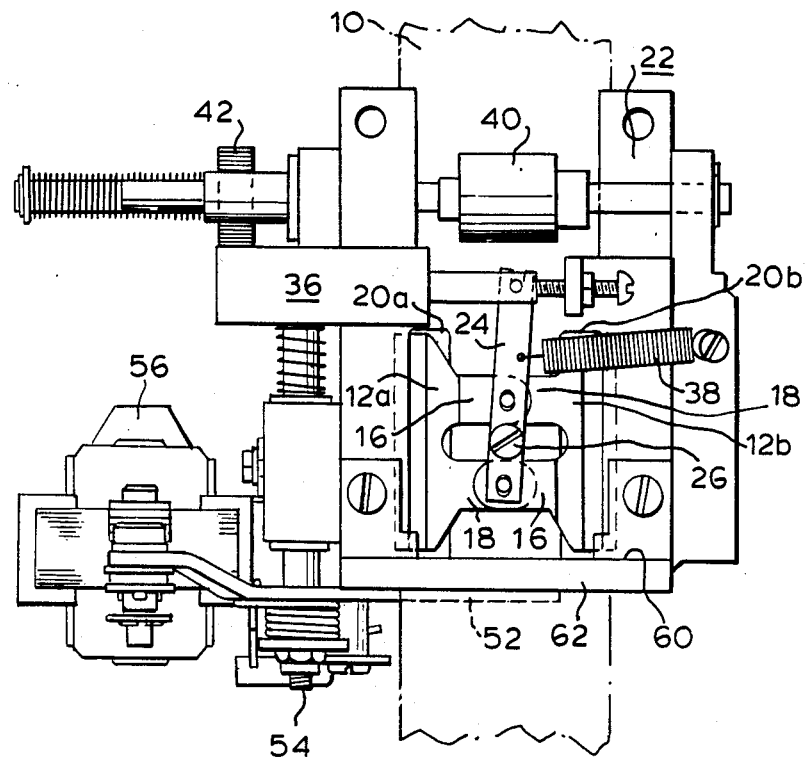
FIG. 2 is an elevation of part of the photographic camera, from behind the exposure plane.

Two identical guides 12a and 12b each have a flange 14 which engages a respective one of two mutually opposite edge portions of the film 10 at the photographic plane. Each guide 12 has two laterally extending arms 16, 18, the planes of which are mutually offset as shown in FIG. 3D, the longer arm 18 being in front of the shorter arm 16, so that the arm 16 of guide 12a overlies the arm 18 of guide 12b and vice versa. The two guides 12a, 12b are slidably mounted as shown in FIGS. 1 and 2 with the flanges 14 projecting forwardly through apertures 20a, 20b in the mounting plate 22 illustrated in FIGS. 4A-4E. The pivoted lever 24 is pivoted to the mounting plate 22 by means of a shoulder screw 26 engaging a hole 28 in lever 24 and a tapped hole 30 in mounting plate 22 and provided with a spacer 27. Referring to FIG. 6A, two pins 32a and 32b provide pivotal connections between the two arms 16 of guides 12a, 12b, one above the other, so that pivotal movement of lever 24 in one direction slides the guides 12a, 12b mutually apart and reverse pivotal movement of lever 24 slides the guides 12a, 12b towards each other again. The arm 18 of each guide 12 is provided with an enlarged aperture 34 to provide clearance for the pins 32. The facing edges 16', 18' (FIGS. 3A, 3B) of the arms 16, 18 are guided by the spacer 27 so that the two flanges 14 of the guides 12a, 12b remain always mutually parallel and parallel to the edges of the film 10.

An electric solenoid 36 is provided for operating the lever 24 to move the guides 12a, 12b apart, that is, to retract them, and a return spring 38 is connected to lever 24 as shown for restoring the guides 12a, 12b to their inward positions guiding the film 10.

A first pair of feed rolls (only the rear roll 40 is shown in FIGS. 1 and 2) are arranged upstream of the exposure plane, that is, above the exposure plane, to feed the film 10 downwardly to the exposure plane, the front roll (not shown) being driven through a cog 42 (by means not shown) and the rear roll 40 being an idler roll.

Downstream of the exposure plane the film passes through a slot 44 in a guide 46 and thence to between a pair of feed rolls 48, 50. Immediately below the exposure plane is a pivoted guillotine 52, pivoted on a shaft 54 and operable by means of a second electric solenoid 56 to guillotine exposed film from unexposed film for further treatment, the solenoid 56 being connected to the guillotine 52 through a linkage 58.

The downstream rolls 48, 50 are arranged to start rotating (driven by means not shown) only after the guillotine 52 has severed the exposed film. In order to ensure that the exposed film is properly engaged between the rolls 48, 50, the upstream feed rolls (driven by cog 42) are arranged to push the film down until it kinks as shown in FIG. 1, and the guillotine 52 causes the trailing end of the exposed film to move under a fixed ledge 60 having a downwardly projecting flange 62 to hold the trailing edge of the exposed film in place until the exposed film is fed by rolls 48, 50 onto the treatment apparatus (not shown).

The sequence of operations is as follows:

To begin with, the leading end of the film 10 is at the position of the guillotine 52, following guillotining of the previously exposed film. To take a photograph, the solenoid 36 is operated so as to pivot the lever 24, which causes the guides 12a, 12b to move apart from each other by the action of the pins 32a, 32b. FIG. 6A illustrates the retracted position and normal position of one of the guides 12b, but only the normal position of the other guide 12a. The camera may be designed to take one photograph, or a plurality of simultaneous photographs, or a sequence of two, three or four photographs, one after another, feeding the film 10 downwardly by means of the upstream rolls (including roll 40) between each two exposures. After each exposure, the solenoid 36 is released and the guides 12a, 12b move towards each other again under the action of spring 38. Then, with the film 10 being guided at the exposure plane by the guides 12a, 12b, the upstream rolls (including roll 40) advance the film 10 until the leading end of the exposed film is engaged between downstream feed rolls 48, 50 and there is a kink in the film as shown in FIG. 1 to maintain pressure of the leading end of the film on the feed rolls 48, 50. Then the guillotine 52 is operated by energisation of solenoid 56 through linkage 58, causing the trailing end of the exposed film, now severed from the leading end of the unexposed film, to be trapped underneath the ledge 60, maintaining the pressure of the leading end of the exposed film on the downstream feed rolls 48, 50. These downstream feed rolls 48, 50 are then activated to feed the exposed film on to the treatment apparatus (not shown).

Because the guides 12a, 12b are retracted, that is to say, moved apart from each other, during the one to four exposures, the edge portions of the film 10 are exposed to take the or each photograph, which is thus 'borderless'.

The above-described and illustrated camera is of the type mentioned earlier, for use in a self-portrait photographic booth, provided with a cue lamp (not shown) warning the subject that the photographs are about to be taken. The retraction of the guides 12a, 12b by energisation of the solenoid 36, may be simultaneous with illumination of the cue lamp. The camera may in fact be a modification of the camera described and illustrated in British patent specification No. 1 493 374 mentioned above, known as the "Model 22".

I claim:

1. A photographic camera comprising two guides for engaging mutually opposite edge portions of photographic film at an exposure plane where said film is exposed to take a photograph, means for supporting each guide in said position of engagement with mutually opposite edge portions and substantially simultaneously temporarily retracting each guide laterally of a respective edge portion so that the edge portions also may be exposed during the taking of said photograph.

2. A photographic camera as claimed in claim 1 wherein a guillotine is provided for guillotining the film.

3. A photographic camera as claimed in claim 2 wherein the guillotine is solenoid-operated.

4. A photographic camera as claimed in claim 2 wherein the guillotine is downstream of the exposure plane, relative to the direction of film feed.

5. A photographic camera as claimed in claim 1 wherein feed rollers are provided downstream of and spaced apart from the exposure plane to receive a leading end of the film and wherein means are provided upstream of said feed rollers to push the leading end of the film to be received by said feed rollers.

6. A photographic camera comprising two guides for engaging mutually opposite edge portions of photographic film at an exposure plane where said film is exposed to take a photograph; means for automatically, in sequence, feeding the film to the exposure plane, stopping the film feed for the photograph to be taken, and then feeding the film to automatic treatment apparatus; and means for temporarily retracting the two guides laterally of their respective edge portions, said retracting means adapted to automatically retract the two guides after the film has stopped for the photograph to be taken so that the edge portions are also exposed and to automatically restore the two guides for the film to be fed to the treatment apparatus.

7. A photographic camera comprising two guides for engaging mutually opposite edge portions of photographic film at an exposure plane where the film is exposed to take the photograph and means for temporarily retracting the two guides so that the edge portions are also exposed, said retracting means functioning in a manner whereby the two guides are arranged to slide mutually away from and towards each other while remaining mutually parallel.

8. A photographic camera as claimed in claim 7 wherein a common pivoted lever is connected to the two guides for moving them.

9. A photographic camera comprising two guides for engaging mutually opposite edge portions of photographic film at an exposure plane where said film is exposed to take a photograph, means for temporarily retracting the two guides from said edge portions so that the edge portions are also exposed, and an electric solenoid activating said retracting means for retracting the two guides.

10. A photographic camera comprising two guides for engaging mutually opposite edge portions of photographic film at an exposure plane where the film is exposed to take a photograph, characterised by means for temporarily retracting the two guides, which are retractable, so that the edge portions are also exposed to take the photograph;

wherein means are provided for automatically in sequence feeding the film to the exposure plane, stopping the film feed for the photograph to be taken and then feeding the film to automatic treatment apparatus, and wherein the means for temporarily retracting the guides is adapted to automatically retract the guides after the film has been stopped for the photograph to be taken and to automatically restore the guides for the film to be fed to the treatment apparatus;

wherein the two guides are arranged to slide mutually away from and towards each other while remaining mutually parallel;

wherein a common pivoted lever is connected to the two guides for moving them; wherein an electric solenoid is provided for retracting the two guides;

wherein a solenoid-operated guillotine is provided for guillotining the film, the guillotine being downstream of the exposure plane, relative to the direction of film feed; and wherein feed rollers are provided downstream of and spaced apart from the exposure plane to receive a leading end of the film and wherein means are provided upstream of said feed rollers to push the leading end of the film to be received by said feed rollers.

* * * * *